United States Patent
Montenegro

(10) Patent No.: US 12,349,611 B2
(45) Date of Patent: Jul. 8, 2025

(54) HARROW DEVICE AND HARROW DISC

(71) Applicants: Valentina Montenegro, Buenos Aires (AR); Camila Montenegro, C.A.B.A. (AR); Gonzalo Montenegro, Buenos Aires (AR)

(72) Inventor: Marcelo Gabriel Montenegro, Buenos Aires (AR)

(73) Assignees: Valentina Montenegro, Buenos Aires (AR); Camila Montenegro, Buenos Aires (AR); Gonzalo Montenegro, Buenos Aires (AR)

( * ) Notice: Subject to any disclaimer, the term of this patent is extended or adjusted under 35 U.S.C. 154(b) by 296 days.

(21) Appl. No.: 17/952,926

(22) Filed: Sep. 26, 2022

(65) Prior Publication Data
US 2024/0099172 A1  Mar. 28, 2024

(51) Int. Cl.
*A01B 21/08* (2006.01)
*A01B 63/16* (2006.01)

(52) U.S. Cl.
CPC ............ *A01B 21/083* (2013.01); *A01B 63/16* (2013.01)

(58) Field of Classification Search
CPC .............................. A01B 63/16; A01B 21/083
See application file for complete search history.

(56) References Cited

U.S. PATENT DOCUMENTS

| | | | |
|---|---|---|---|
| 3,170,421 A | 2/1965 | Norris et al. | |
| 4,016,935 A | 4/1977 | Miller | |
| 7,607,489 B2 | 10/2009 | Kelly et al. | |
| 7,963,345 B1 * | 6/2011 | Hicks et al. | A01B 21/08 172/612 |
| 11,337,353 B2 * | 5/2022 | Ainge et al. | A01B 21/08 |
| 2011/0203818 A1 * | 8/2011 | Hicks et al. | A01B 21/08 172/311 |
| 2017/0013770 A1 * | 1/2017 | Ainge | A01B 23/06 |
| 2020/0170166 A1 * | 6/2020 | Paterson | A01B 7/00 |

FOREIGN PATENT DOCUMENTS

| | | | | |
|---|---|---|---|---|
| CA | 2631943 C | * | 9/2010 | A01B 21/08 |
| SU | 1523061 A2 | | 11/1989 | |

* cited by examiner

*Primary Examiner* — Tara Mayo
(74) *Attorney, Agent, or Firm* — Norris McLaughlin, PA

(57) ABSTRACT

A harrow device for the conditioning and leveling of sowing soils in a single step, and a disc for the harrow, which allows these processes to be carried out in the proper way, guaranteeing a better quality of subsequent sowing, and also preventing premature wear of parts, jamming of materials, and/or emergency stops, and which, in turn, is constituted and built in a simple way, in order to reduce costs and facilitate both its realization and its replacement.

7 Claims, 15 Drawing Sheets

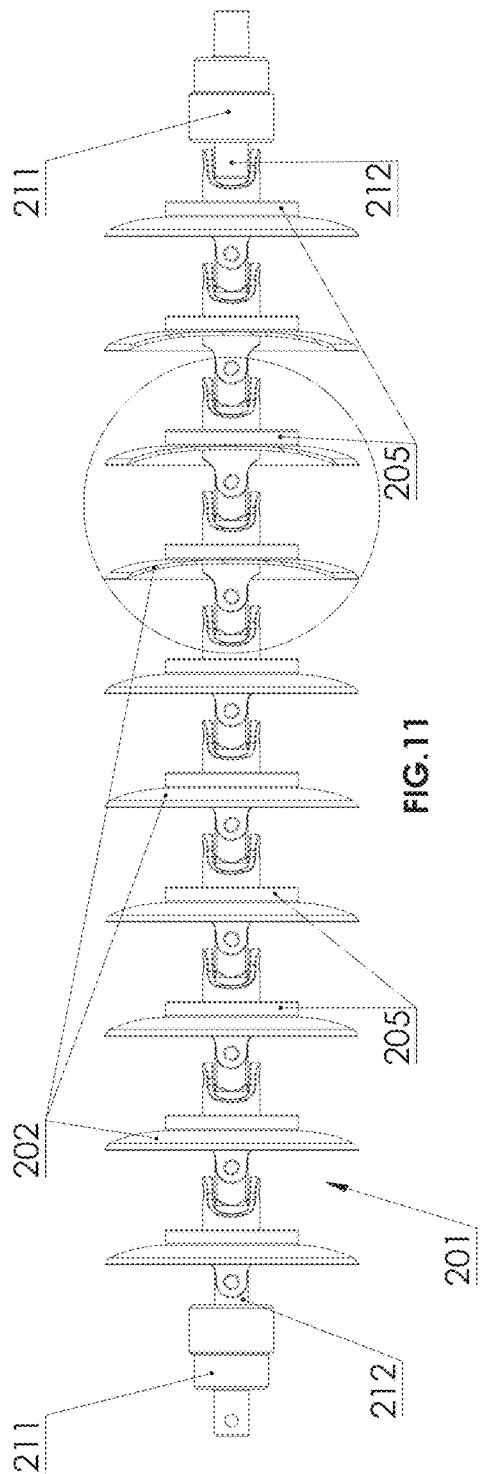
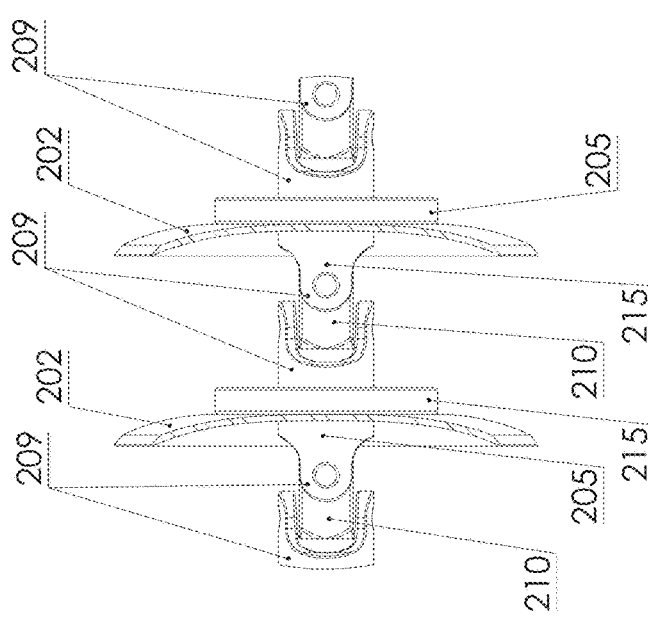
FIG. 11
FIG. 12

HARROW DEVICE AND HARROW DISC

FIELD OF INVENTION

The present invention refers to devices, means or arrangements used in soil conditioning processes in sowing fields in the agro-industry, and more particularly to a harrow device that notably improves the conditioning and leveling process given its simple construction feature that avoids jamming in discs as well as reduces stresses and fatigue generated on the tensioning and fixing parts of the frame. The invention also refers to a harrow disc for the aforementioned harrow device, which facilitates its assembly as well as its replacement in case of breakage in a practical, fast and easy way, avoiding the processes of cutting, welding and high related costs.

DESCRIPTION OF PRIOR ART

The preparation and conditioning of the land for subsequent sowing is a fundamental process that must be carried out as appropriate as possible, since the quality of the crop obtained at harvest will depend on it. Generally, after harvesting, the soil presents unfavorable conditions for sowing, since it includes weeds, stubble, and loose elements that must be uprooted, removed, or destroyed. Likewise, the soil must be leveled to provide an adequate condition for sowing.

Currently, the conditioning and leveling processes are carried out by means of harrow devices. One type of device may be that disclosed in Patent Document SU 1523061 which teaches a heavy chain having a plurality of interconnected links that can be pulled by a tractor. As the tractor moves forward, the chain drags loose stubble or debris on the surface so as to level the soil.

Still another type may be that disclosed in US Patent Document 3,170,421 which comprises a machine which is intended to reduce or, in so doing, break up compacted soil well below the depth to which a normal mouldboard plough would normally run.

Yet another type may be that disclosed in US Patent Document 4016935 which teaches a spacer spool for a disc section of a disc harrow to prevent relative rotation between spacer spools and adjacent disc blades.

Another type may be that disclosed in US Patent Document 7607489, which teaches an agricultural implement including first and second outer harrows located on adjacent front and left sides and front and right sides of a frame, respectively, in generally opposite diagonal directions. It further features third and fourth harrows similarly positioned adjacent the rear and left sides and the rear and right sides of the frame, respectively, in generally opposite diagonal directions. Each harrow includes a plurality of discs and a chain with a plurality of links, and each line of harrow discs is tensioned by means of tension assemblies. The discs are fixed to a chain and each tension assembly is made up of a vertical column that passes through said frame and has upper and lower arms that extend in a protruding direction thereof, wherein said lower arm is coupled with a end of the respective chain and said upper arm is coupled with said frame by means of a spring, and wherein the column is rotatable.

Although the aforementioned devices have been used until now, there are still a number of unresolved drawbacks. One of them is related to the removal of weeds and stubble from the soil. Although some of the devices manage to weed or partially remove the stubble, most do not do it properly, so the subsequent leveling has major shortcomings. Another of the drawbacks occurs with the jamming of material between the parts of the harrow devices, generating in many cases their breakage and stoppage of the harrow machine.

On the other hand, not all devices manage to carry out the conditioning and leveling processes in a single step. More than one unit is required to carry out conditioning and leveling. While the parts of those being multipurpose are subjected to great tensions and stresses that lead to breakage, compromising both the device that must be stopped for repair as well as the conditioning and/or leveling process that must be delayed. In turn, the parts used in current multipurpose devices are complex parts to make and impractical to carry out their replacement.

In the case of Kelly's U.S. Pat. No. 7,607,489, and particularly in FIGS. 4a and 4b thereof, it can be seen that it presents a chain of discs joined by half-links that are apparently welded to each side of the discs. This brings about a series of complications since if a disc needs to be changed in the harrow disc chain, the links have to be cut and replaced with new ones, which entails welding on site or in the workshop, having to previously disassemble the disc line and the harrow. As can be seen, this generates a high cost and delays in operation times, and many times the continuity of the soil leveling process must be left for another day. Due to the constant breakage of the discs, the lack of practicality in the replacement of the links or discs, brings about the aforementioned drawbacks. In addition, the construction of discs like the Kelly's one with its welded links, entails high costs due to the design and construction of the discs.

By virtue of the foregoing, it would be very appropriate to have a new arrangement or device that correctly conditions and/or levels the land, being easy to carry out, practical to replace and that avoids jamming, tensions and/or fatigue on its parts in order to avoid emergency stops due to breakage and wherein an easy assembly and/or replacement of the links as well as the discs in case of breakage is allowed, optimizing operating times and reducing related costs.

BRIEF DESCRIPTION OF THE INVENTION

It is therefore an object of the present invention to provide a new harrow device, apparatus or system that is constituted and constructed in a simple manner, allowing conditioning and/or leveling of soil in an adequate manner to provide better sowing conditions.

Another object of the present invention is a harrow device that can carry out the conditioning and leveling processes in a single step.

It is yet another object of the present invention to provide a harrow device that uproots weeds, stubble and other loose elements on the soil.

It is also another object of the present invention to provide a harrow device that is constructed and constituted in such a way as to reduce the tensions in parts, avoiding breakages and emergency stops.

It is another object of the present invention to provide a tensioning means that improves the tension of the harrow disc line in order to improve the leveling and conditioning process of soils.

It is still another object of the present invention to provide a connection member to generate a mechanical link between harrow discs selected between a flexible cable or a crosshead.

It is yet another object of the present invention to provide a harrow device for the conditioning and leveling of sowing soils comprising a frame or chassis which has a front pulling part, a rear part, respective right and left jointed wings, running gear mounted below said frame and a plurality of harrowing means or members arranged below and diagonally between the front, rear and right and left wings of the frame, each of said harrowing means or members comprising: at least a plurality of discs, each of which has at least one central opening and are removably fixed to respective connecting members through respective hubs, jointly defining a line of harrow discs, at least two bearing housings connected at the ends of said harrow disc line, at least one tensioning means mounted on said frame and connected to at least one of the bearing housings, and at least one height adjusting means mounted on said frame and connected to at least the other bearing housing. It is also an object of the present invention to provide a new harrow disc that is constituted and constructed in a simple way, allowing its assembly and/or substitution in a practical, fast and easy way.

Another object of the present invention is a harrow disc that has a pair of half-links on each side, which are fixed by means of removable fixing elements, avoiding the use of welding and more particularly, avoiding breakage of the link in case disc replacement.

It is yet another object of the present invention to provide a harrow disc that avoids link cuts, welds and the delay times that this entails.

It is also another object of the present invention to provide a harrow disc that improves the insertion of the disc in the soil by the provision of some counterweights.

It is another object of the present invention to provide a lightweight harrow disc that reduces related costs.

It is yet another object of the present invention to provide a harrow disc comprising: at least one disc plate provided with a plurality of fixing holes; at least one pair of half-links that are arranged on each side of the disc plate, wherein each one has a base that is operatively in contact with the faces of said disc plate and provided with matching holes aligned with respective holes of the plurality of fixing holes of the disc plate; at least one pair of counterweight plates provided on each side of the disc plate, each one having holes that are aligned with respective holes of the fixing holes of said disc plate; and fixing elements that pass through the holes made on the counterweight plates, the base of the half-links and the disc plate, operatively fixing them to each other in a removable manner.

BRIEF DESCRIPTION OF THE DRAWINGS

For greater clarity and understanding of the object of the present invention, it has been illustrated in several figures, in which the invention has been represented in one of the preferred embodiments, all by way of example, wherein:

FIG. 11 shows a side view of a part of one of the harrowing means or members according to a third preferred embodiment;

FIG. 12 shows a detailed view of the assembly and coupling between discs according to FIG. 11;

DETAILED DESCRIPTION OF THE INVENTION

Figure 1:
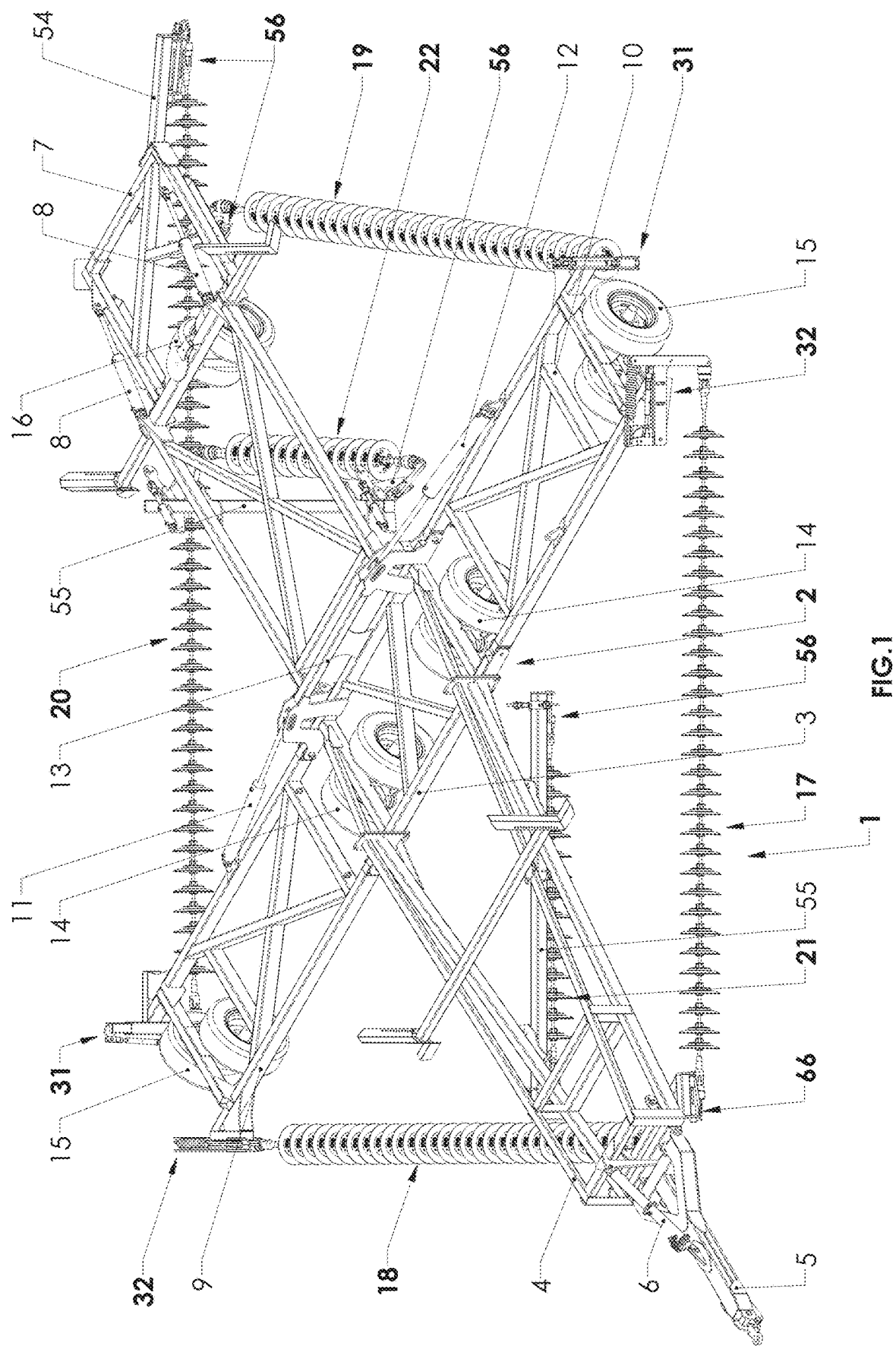
FIG. 1 shows a front perspective view of the harrow device according to the present invention.

Referring now to the FIGS. 1-9, it can be seen that the invention consists of a new harrow device for the conditioning and leveling of sowing soils in a single step, which allows carrying out said processes in the appropriate manner, guaranteeing a better quality of subsequent sowing, and also being that it avoids premature wear of parts, jamming of materials, and/or emergency stops. In turn, the invention is constituted and constructed in a simple way, in order to reduce costs and facilitate both its realization and its replacement.

Thus, and according to F 1 to 9, the harrow device of the present invention is indicated by the general reference 1 and comprises a frame or chassis 2 that has a central part 3 to which a front pulling part 4 is connected with a drawbar 5 jointed by means of a telescopic arm 6, a rear part 7 with an jointed portion by means of telescopic arms 8, respective right 9 and left 10 jointed wings through respective telescopic arms 11 and 12 mounted between said wings and upper ends of a bridge 13 provided in said central part 3 of the frame 2, the lower ends of the bridge 13 defining joint points with respect to said wings 9-10. Likewise, there are running gears mounted below said frame 2 which include central 14, lateral 15 and rear 16 running gears which will allow the movement of the device. It is clarified that the definition of the positioning of the right 9 and left 10 wings is merely indicative for illustrative purposes and is not a limitation for the invention.

On the other hand, the present invention is provided with a plurality of harrow means or members, more preferably but not limited to at least four outer harrow means or members arranged below and diagonally between the front, rear and right and left wings of the frame, and are defined as a first harrow means or member 17, a second harrow means or member 18, a third harrow means or member 19 and a fourth harrow means or member 20, and at least two inner harrow means or members or "combs" defined by a front inner harrow means or member 21 and a rear inner harrow means or member 22 which will allow the conditioning and leveling of those parts of the soil that were not treated by the outer harrow means. It is highlighted that the amount of harrow means may vary depending on the dimensions of each device and the needs of each user.

Figure 2:
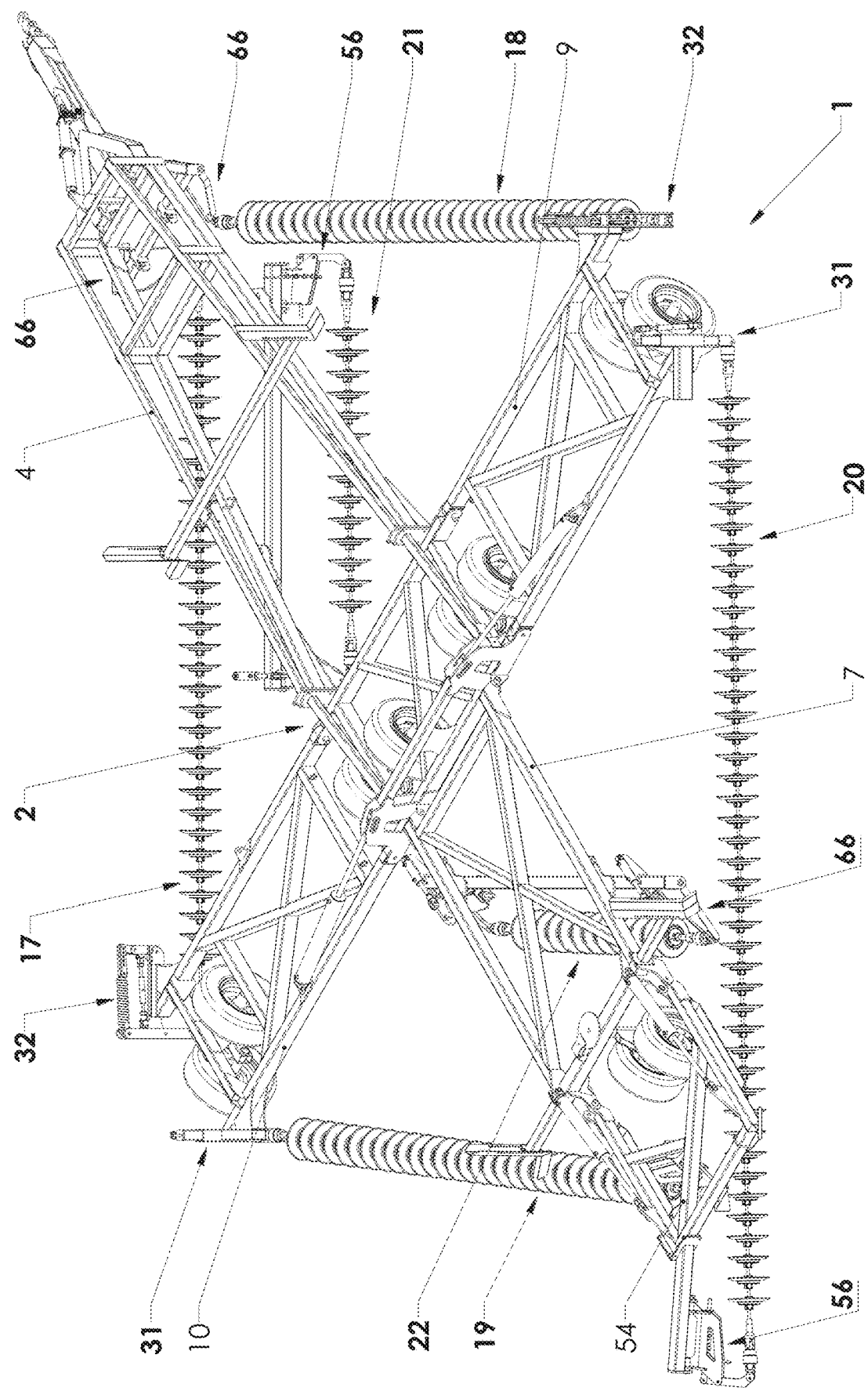
FIG. 2 shows a rear perspective view of the harrow device of the invention.

As can be seen in FIGS. 1 and 2, said first harrow means 17 is arranged between the front part 4 of frame 2 and said left wing 10; said second harrow means 18 is arranged between the front part 4 of the frame 2 and said right wing 9; said third harrow means 19 is arranged between the rear part 5 of the frame 2 and said left wing 10; said fourth harrow means 20 is arranged between the rear part 7 of the frame 2 and said right wing 9; said front inner harrow means 21 is arranged below said front part 4 of the frame and between the first-second harrow means 17-18; and said rear inner harrow means 22 is arranged below said rear part 7 of the frame and between the third-fourth harrow means 19-20.

It is emphasized that said numbering of the harrow means is merely illustrative and for the purpose of simplifying the understanding of the object of the present invention, this not being a limitation. Likewise, it can be seen that the harrow means are mounted on the respective parts of the frame separately from each other. The first and second harrow means form the front outer harrow means, while the third and fourth harrow means form the rear outer harrow means, this arrangement and definition not being limiting for the invention.

Figure 3:
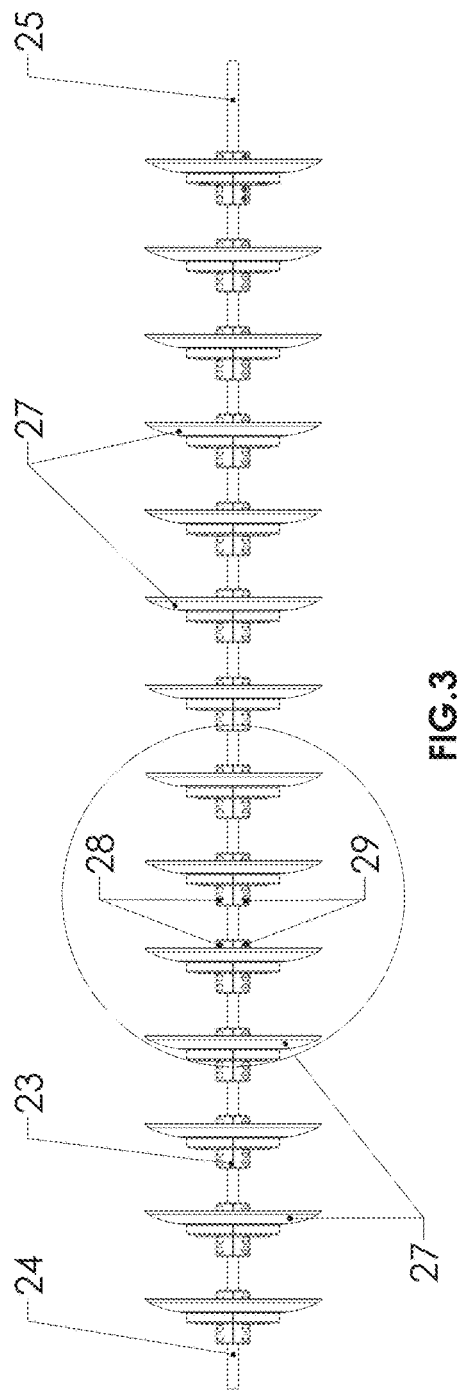
FIG. 3 shows a side view of a portion of a harrow means according to the invention.
Figure 4:
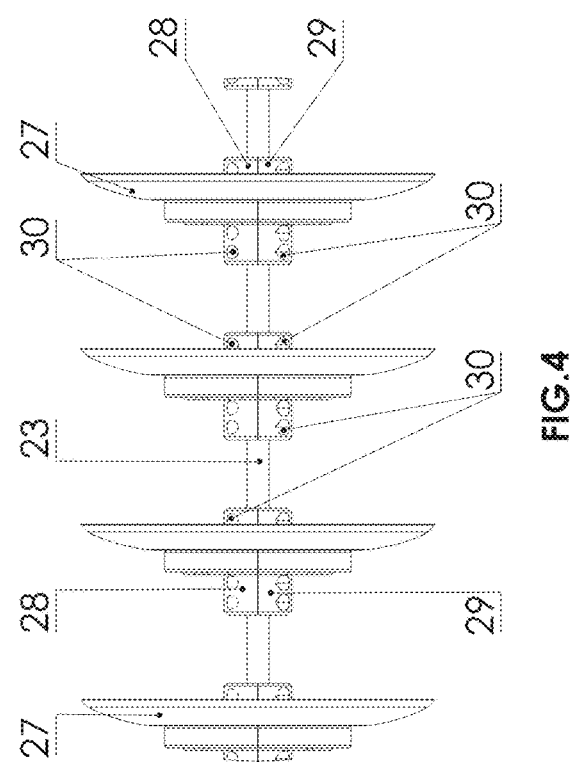
FIG. 4 shows a detailed and partial view of the harrow means of FIG. 3.
Figure 5:
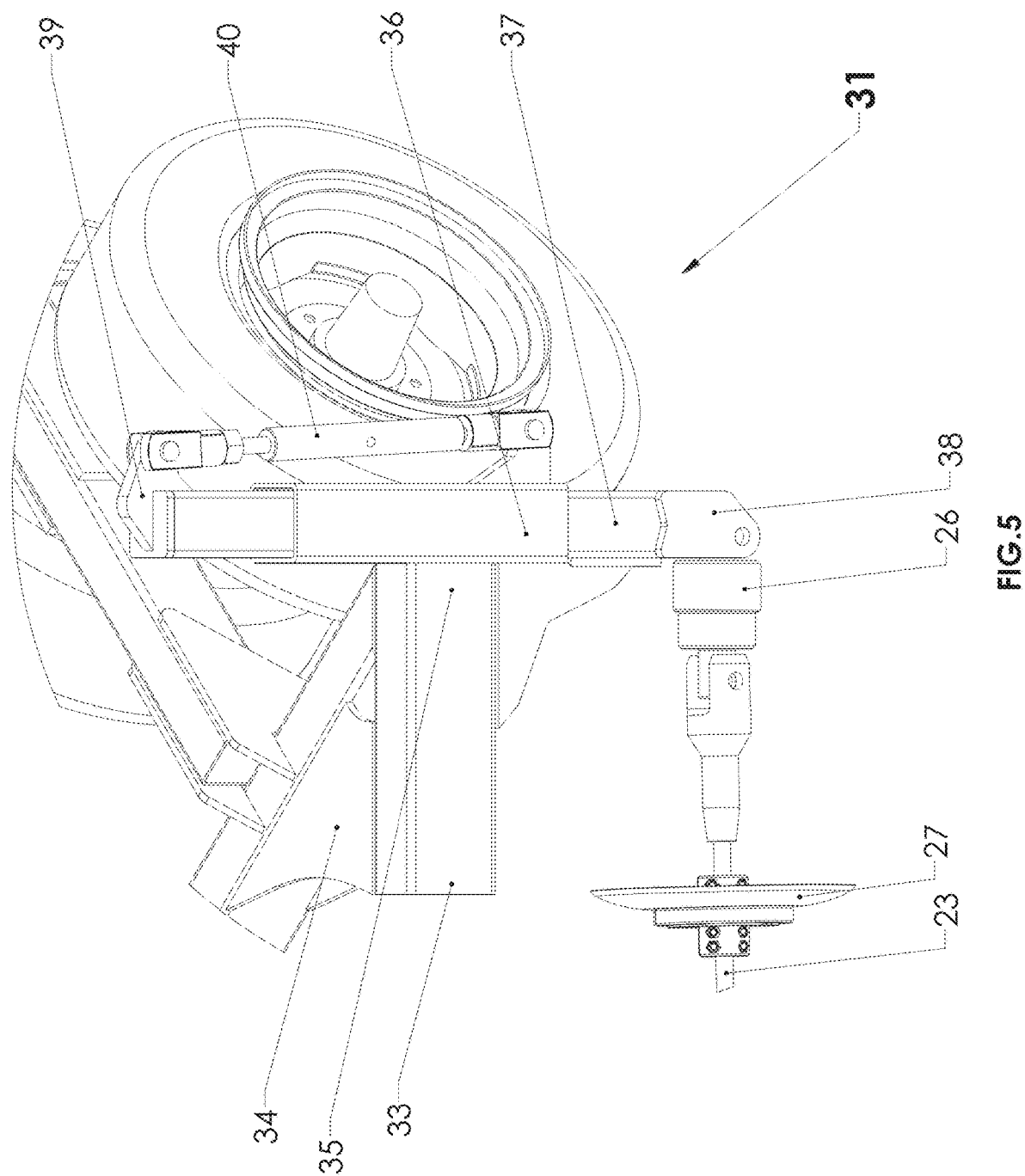
FIG. 5 shows a detailed view of another portion of the harrow means according to the invention, wherein a height adjusting element can be seen.
Figure 6:
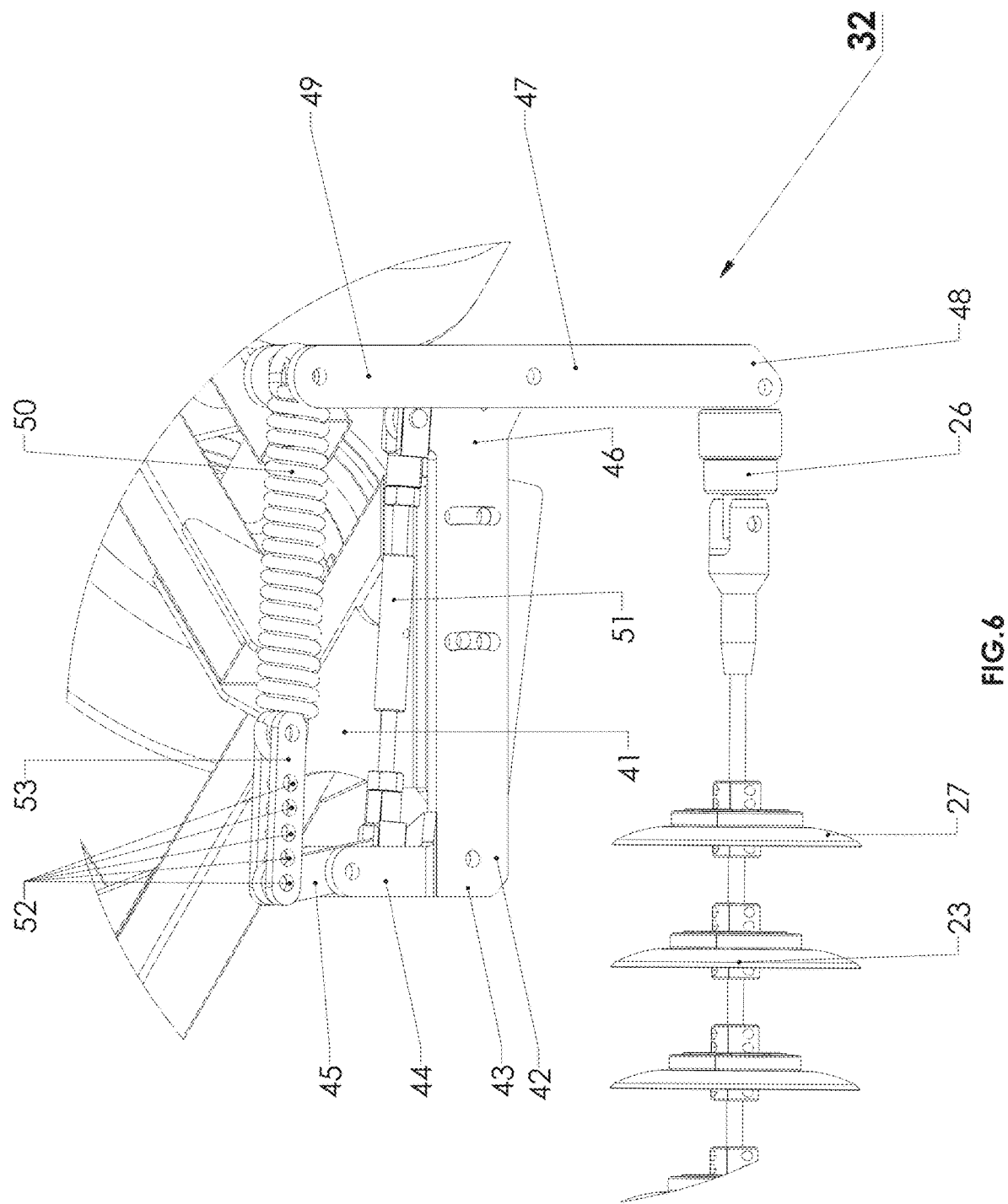
FIG. 6 shows a detailed view of another portion of the harrow means according to the invention, wherein a tensioning element can be seen in a first preferred embodiment.

According to FIGS. 3 and 4, each of said outer and inner harrow means comprises at least one connection member that can be, in a first preferred but not limiting embodiment, at least one or more flexible cables 23 that can be made of steel braided with each other or between them, with a twist that can go from right to left or vice versa, which in turn can be built in the different variables and schemes thereof, both in the number of secondary cables that make up their totality, as well as in the number of steel filaments that make up each of said secondary cables, the core being made of steel or textile indistinctly, and may be made of black steel, galvanized steel or stainless steel. In turn, said flexible cable 23 has respective ends 24 and 25 connected, in a first but not limiting embodiment, to respective bearing housings 26, as best illustrated in FIGS. 5 and 6. Likewise, each harrow means is provided with at least a plurality of harrow discs 27 each of which have a central through opening (not shown) through which, and together with respective fixing hubs 28-29, they are fixed on said flexible cable 23, jointly defining a line of harrow discs.

In this way, each harrow disc 27 is fixed to said flexible cable 23 by means of the set of fixing hubs 28-29, allowing the joint rotation of the discs 27 with the flexible cable 23 by virtue of the bearing housings 26 arranged on the ends thereof. The design of the fixing hubs 28-29 and flexible cable 23 provides a "clean" design that allows the material to "slide" without jamming during the conditioning and leveling process, thus avoiding the usual jamming of material that is generated in the prior art, particularly in the implement of Patent Document U.S. Pat. No. 7,607,489. It is noted that the fixing hubs in this embodiment, but not limiting for the invention, may comprise two complementary parts 28-29 which trap the disc 27 against the flexible cable 23, being removably fixed by means of respective screws 30.

On the other hand, and according to FIG. 5, there is provided at least one height adjusting means 31 comprising at least one support arm 33 having a proximal end 34 mounted on said respective part of the frame and a distal end 35 connected to at least one outer telescopic tube 36 inside which an inner telescopic tube 37 is mounted having a lower end 38 connected to said bearing housing 26 through a rotation axis (not shown) and an upper end 39 which is operatively connected to a threaded turnbuckle 40 which in turn is connected inferiorly to a lower portion of the outer telescopic tube 36. The height adjusting means 31 will allow the height of the harrow disc line to be adjusted. Likewise, the height adjusting means 31 is fixed and can be located in the front part of each line of discs of the rear outer harrow means, but not limiting the invention, to pull it firmly and constantly with the drive line, and it only has a threaded turnbuckle to adjust the height of the inner telescopic tube, which, being connected to the bearing housing at the beginning of each chain, manages to adjust the height of the first discs.

According to FIG. 6, and in a first preferred embodiment, there is provided at least one tensioning means 32 comprising at least one support arm 41 having a proximal end mounted on said respective portion of the frame and a distal end connected to at least one pivot plate 42. Wherein, said pivot plate 42 comprises a proximal end 43 provided with a fixing plate 44 on which at least one selector cam 45 is pivotally fixed, and a distal end 46 connected to a pivot arm 47 having a lower end 48 operatively connected to the bearing housing 26 through a rotation axis (not shown), and an upper end 49 to which a spring 50 is connected.

For its part, said selector cam 45 is inferiorly connected to a tension damper 51 which is mounted between said fixing plate 44 of the pivot plate 42 and said pivot arm 47, while superiorly, said selector cam 45 is selectively positioned between a plurality of tension selector holes 52 made on a tension selector plate 53 which in turn is connected to said spring 50. The selector cam 45 pivots at its lower point and at its upper end it has a hole (not shown) that selectively matches with the pairs of tension selector holes 52 of the tension selector plate 50, wherein its fixation is selective by means of a bolt (not illustrated) that passes through said holes of the cam 45 and tension selectors 52 to fix the position suitable for the tension requirements for each flexible cable 23. Each pair of tension selector holes 52 will define a tension level of the cable 23 according to the requirements of each device and process. It should be noted that, in the case of the fourth harrow means 20, the rear part 7 of the frame 2 has an extension crossbar 54 at the distal end of which, but not limited thereto, a tensioning means 56 is mounted which will be described below. The tensioning means 32 or 56, will allow adequate tensioning and damping of the stresses and tensions generated by the irregular paths and loose impediments of the soil where the harrow device passes.

According to FIGS. 7 and 8, the front 21 and rear 22 inner harrow means are mounted below the frame by means of a respective crossbar 55, at the ends of which there are respective second tensioning means 56 and pivoting support arms 66. Wherein, each of the second tensioning means 56 can comprise a pulling arm 57 having a lower end 58 connected to a fork 59 that is coupled to the respective bearing housing 26 and an upper end 60 connected to a adjusting screw 61 with spring. The tensioning means 56 can be mounted on the crossbar 55 by means of respective side plates 62 supported by respective plates or pivot 63 that pivot on respective axes 64. Likewise, said second tensioning means 56 is provided with a height adjusting anchor 65 that has a upper portion with a hole through which said adjusting screw 61 passes, leaving the spring retained and thus allowing the height adjustment of the first discs.

Figure 8:
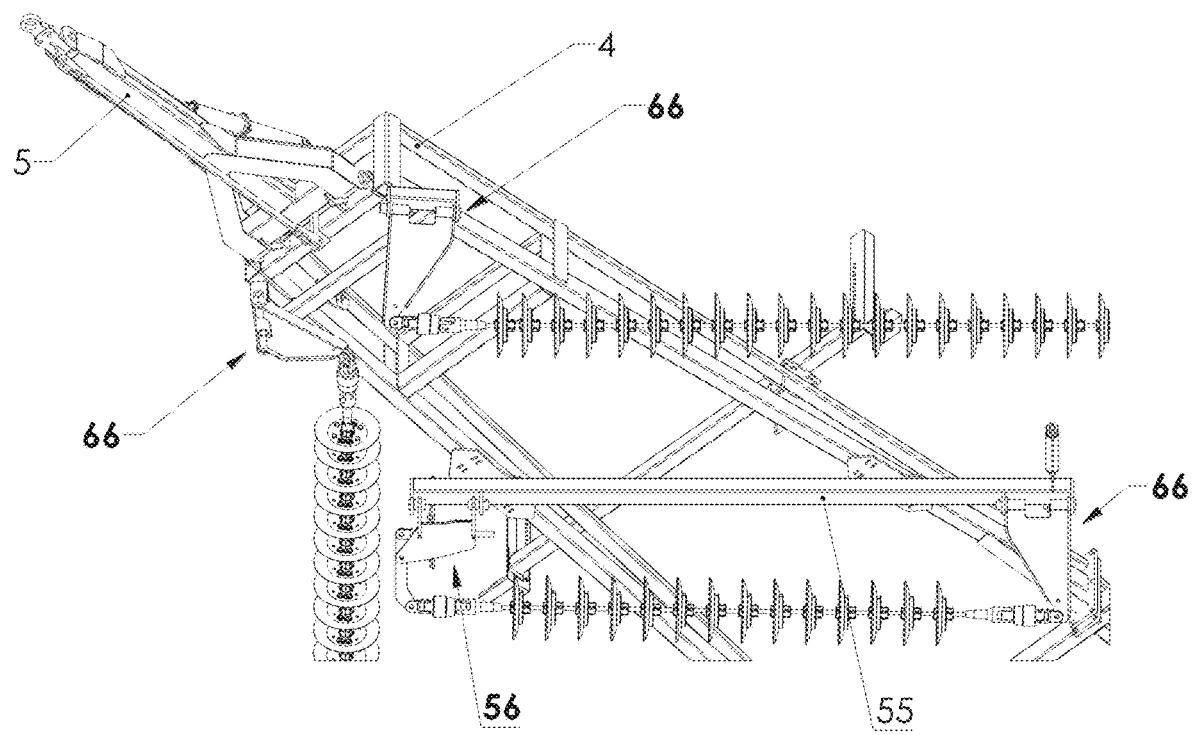
FIG. 8 shows a partial perspective view from below of the front part of the frame.
Figure 9:
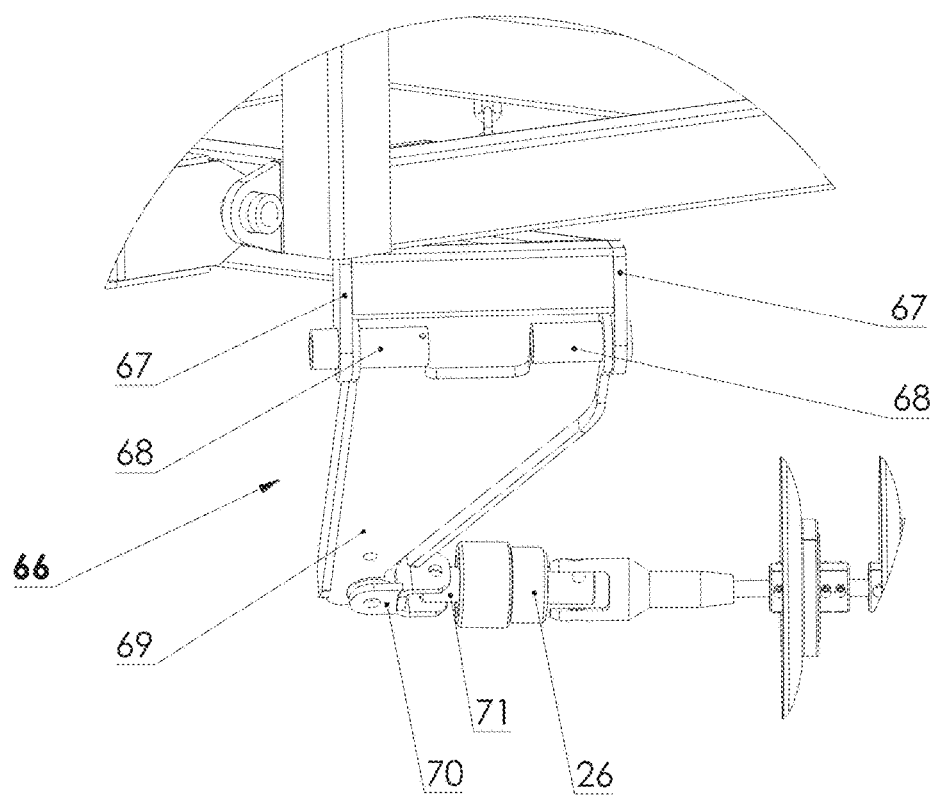
FIG. 9 shows a view of a pivoting support arm according to the present invention.

According to FIGS. 8 and 9, said pivoting support arm 66, which height is adjusted by means of a simple link chain, is mounted on the respective parts of the frame by means of respective anchoring plates 67, at the lower ends of which a respective pivot shaft 68 is mounted, being in turn that from the outer ends of said pivot shafts 68 a pivot plate 69 extends which is pivotally connected thereto, projecting downwards to a clamping plate 70 provided with a rotation axis 71 that connects with the respective bearing housing 26.

The respective joint arrangement of a height adjusting means 31, tensioning means 32, 56 and pivoting support arm 66, will allow the adequate tensioning of the flexible cable 23 and, in turn, the damping thereof to release tensions and stresses due to the unevenness or material encountered during the conditioning and/or leveling route. It should be noted that, as mentioned above, the "clean" design of the flexible cable 23, discs 27 and fixing hubs 28-29 allows further relieving the stresses and tensions generated, resulting in a longer useful life of the parts.

Figure 10:
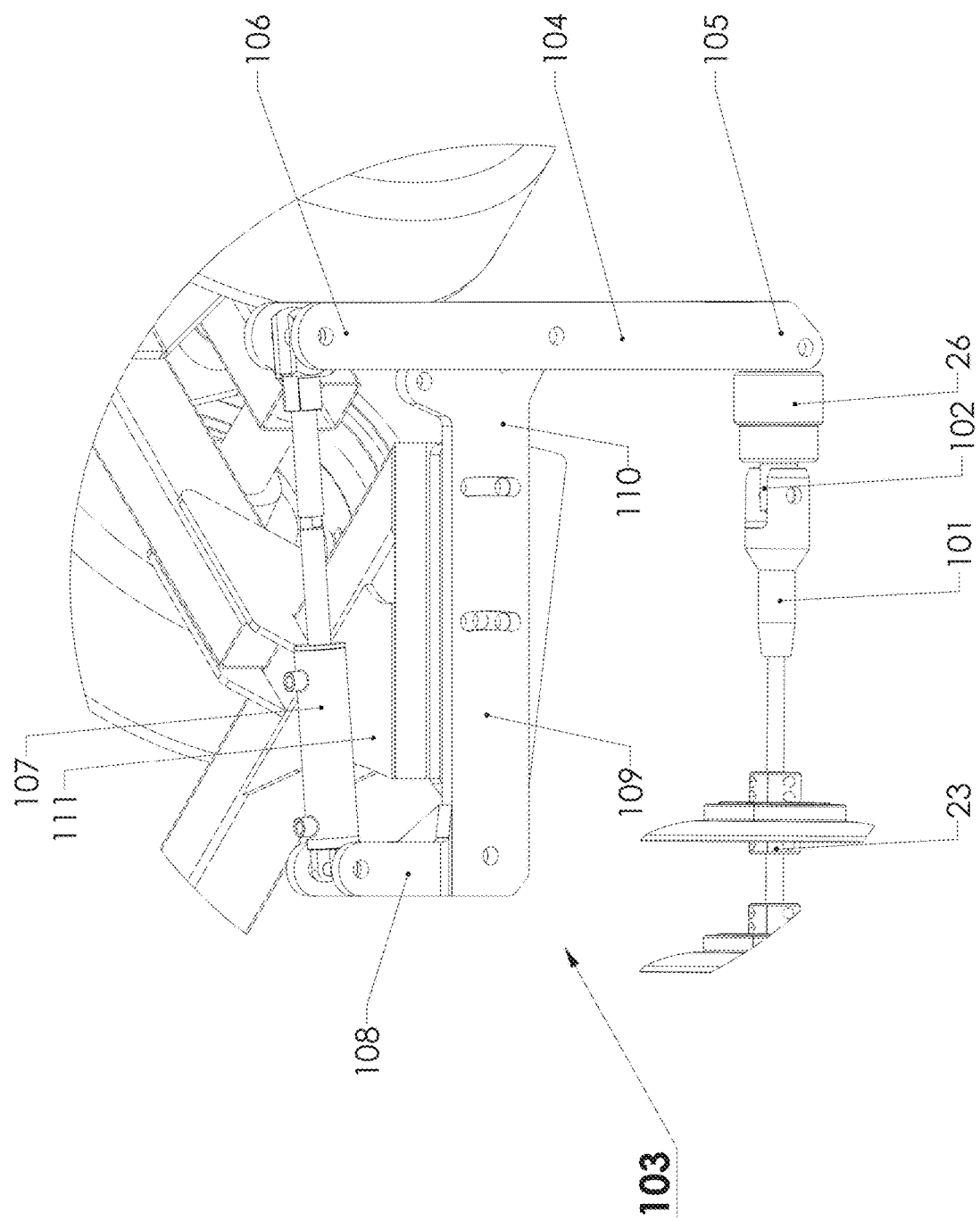
FIG. 10 shows a view of a second preferred embodiment in which another type of mounting for the flexible cable is illustrated, and more particularly another type of tensioning means according to the invention.
Figure 14:
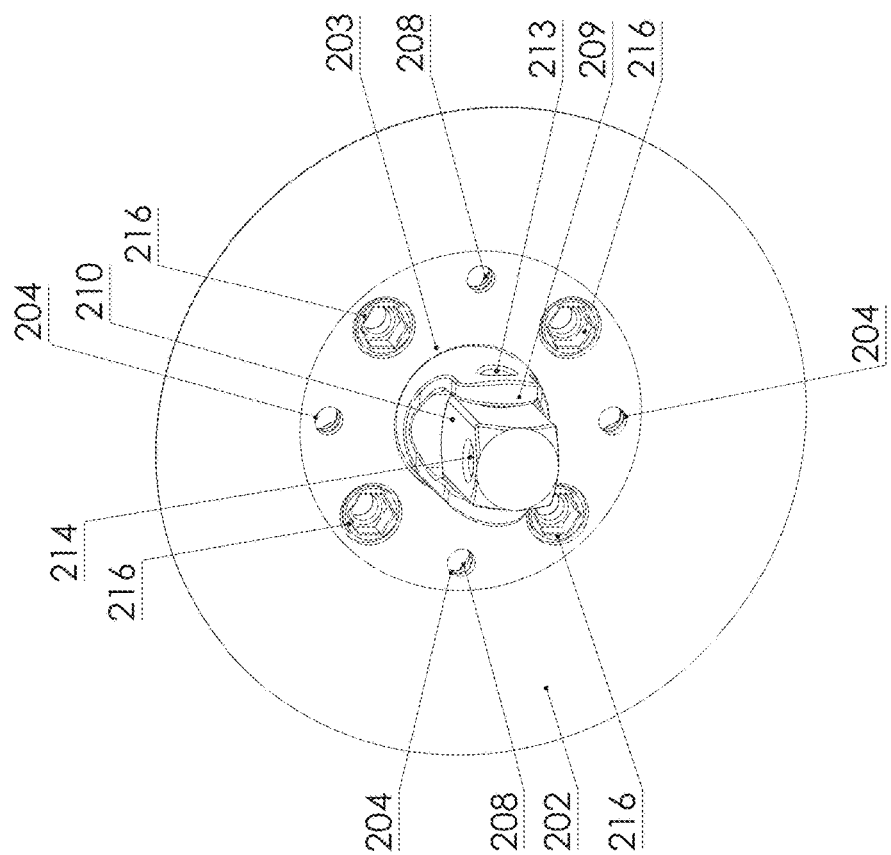
FIG. 14 shows an enlarged view of a hub on which a disc is mounted according to the third embodiment of the invention.
Figure 13:
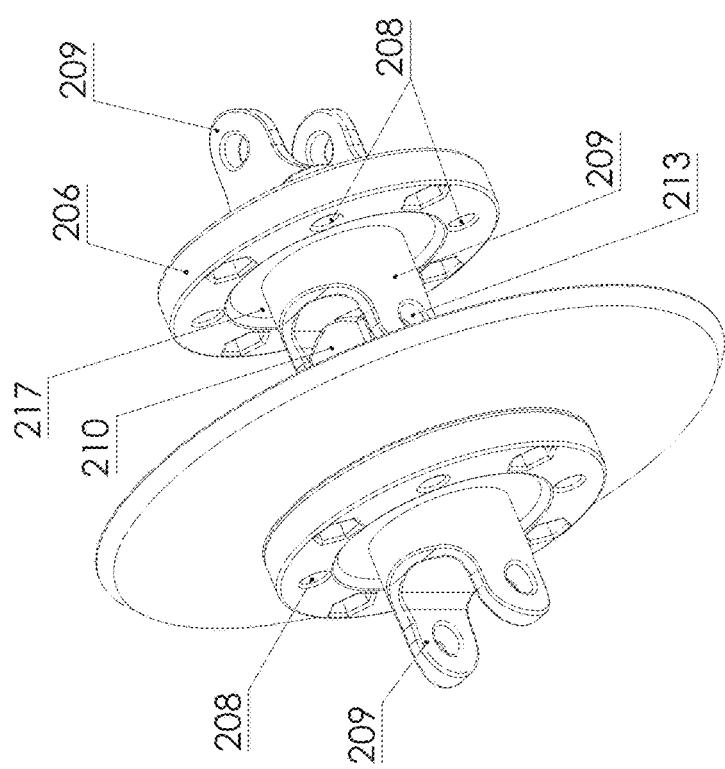
FIG. 13 shows a perspective view of two hubs and their joint according to the third preferred embodiment.
Figure 15:
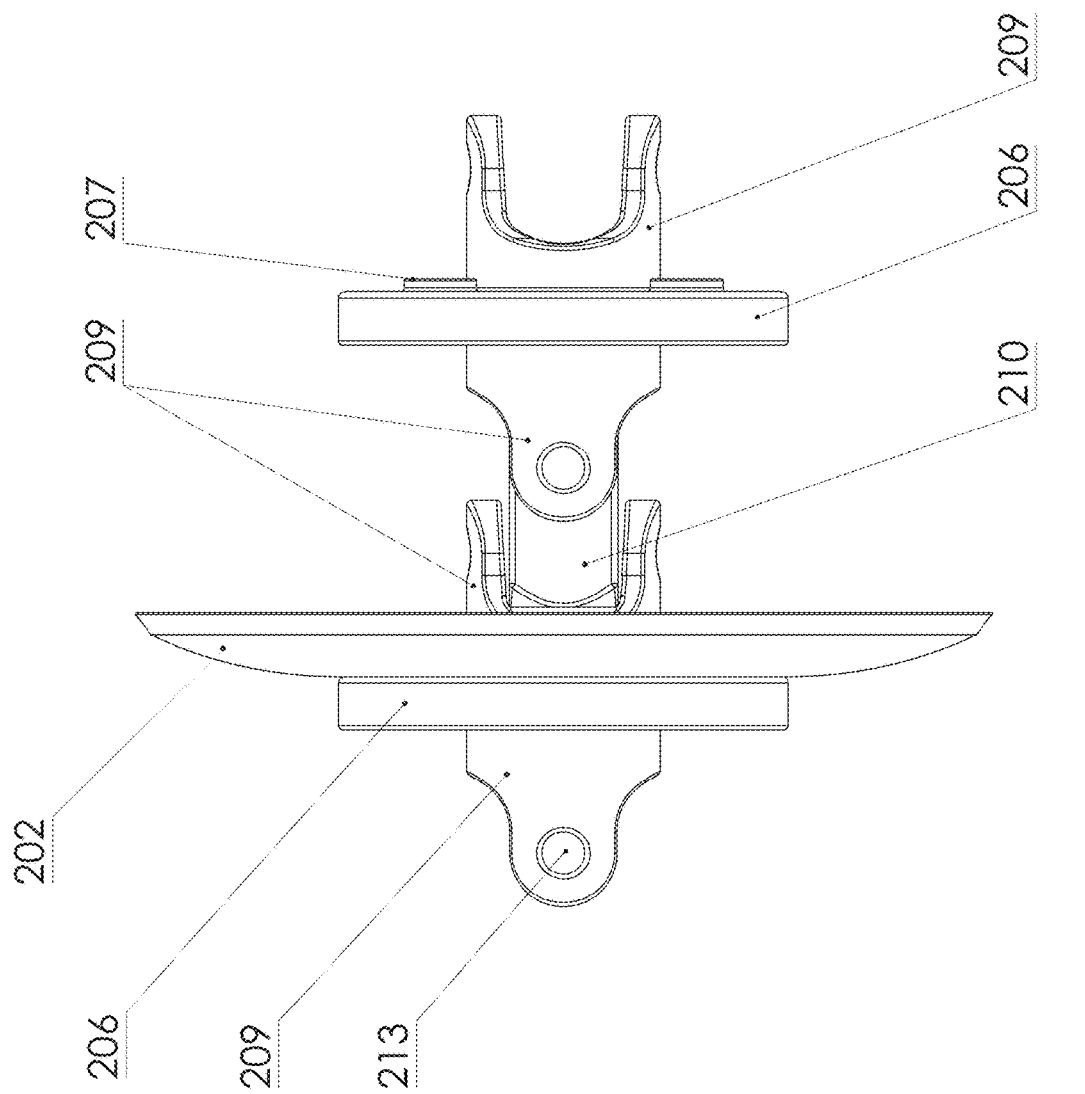
FIG. 15 shows a side view according to the third preferred embodiment.
Figure 16:
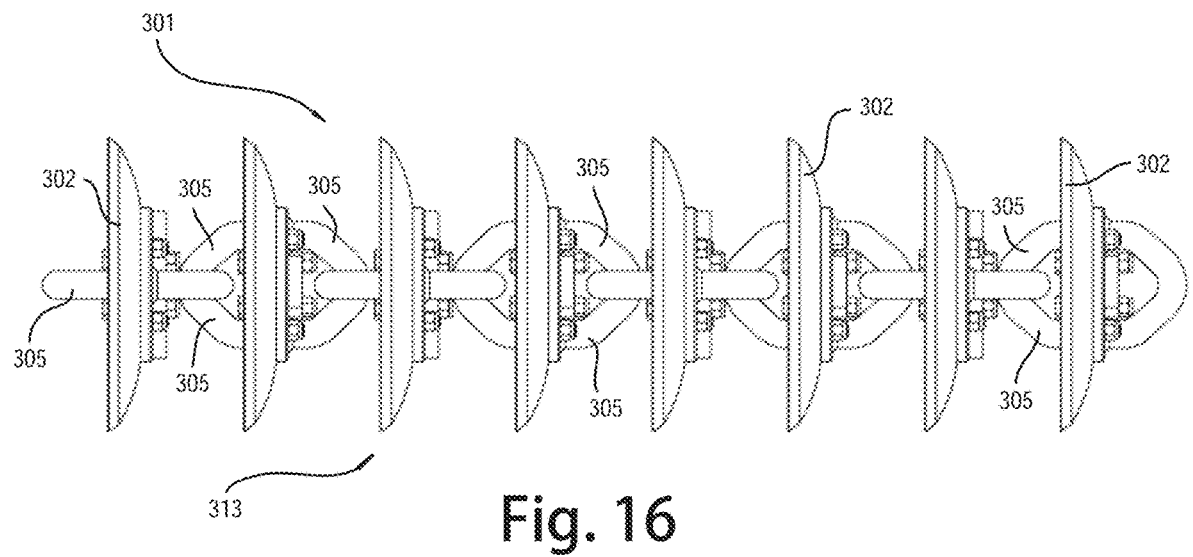
FIG. 16 shows a side view of a chain of harrow discs according to the present invention.
Figure 17:
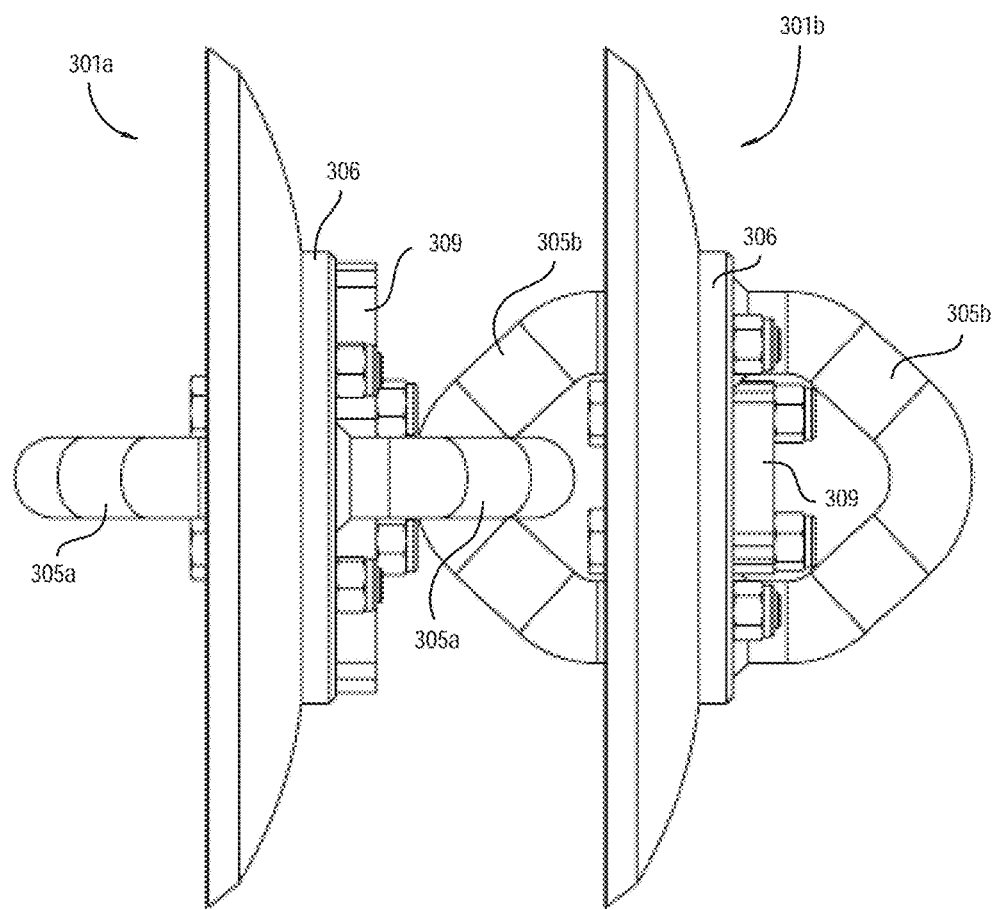
FIG. 17 shows a side view of two harrow discs according to the invention, wherein the joint between their links can be seen in more detail.
Figure 18:
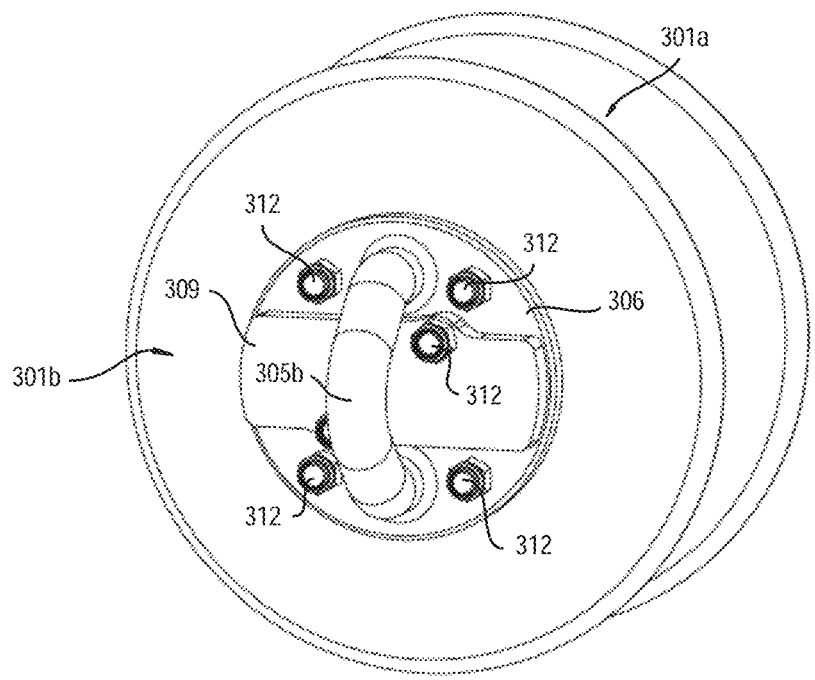
FIG. 18 shows a perspective view of the discs of FIG. 17.
Figure 19:
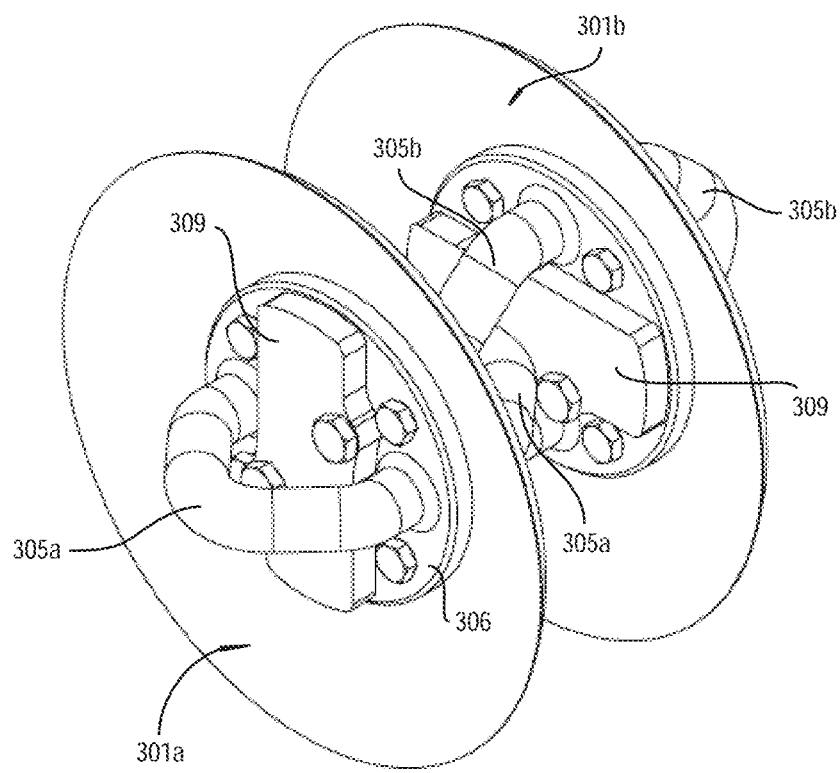
FIG. 19 shows a perspective view of the discs of FIG. 17, taken from another side than that of FIG. 18.

According to FIG. 10 and in a second preferred embodiment, the connection between the flexible cable 23 and the bearing housing 26 can be established by means of a fork 101 which is connected to a rotation axis 102 operatively mounted on said bearing housing 26. On the other hand, there is provided a tensioning means 103 comprising a pivot arm 104 which has a lower end 105 connected to said bearing housing 26, and an upper end 106 in which one end of a hydraulic cylinder 107 is connected. In turn, said hydraulic cylinder 107 is mounted on a clamping plate 108 provided on a pivot plate 109 that has a distal end 110 connected to a portion of said pivot arm 104. Likewise, said tensioning means 103 is mounted on the respective part of said frame by means of a clamping arm 111.

It is clarified that, each end of the lines of harrow discs of each outer harrow means can be, but not being limited thereto, provided with a respective combination between said height adjusting means 31, pivoting support arm 66 and said tensioning means 32, 56, 103 which are mounted on the respective parts of the frame. By way of example but not limiting the invention, the line of harrow discs of said first outer harrow means 17 has a rear end connected to a tensioning means 32 mounted on a part of the left wing 10 of the frame 2, and a front end connected to a pivoting support arm 66 mounted on a portion of the front part 4 of the frame 2. Likewise, the line of harrow discs of said second outer harrow means 18 has a rear end connected to another tensioning means 32 mounted on a part of the right wing 9 of the frame 2, and a front end connected to another pivoting support arm 66 mounted on a portion of the front part 4 of the frame 2, being separated from the first pivoting support arm 66 which supports the line of the first harrow means 17.

In turn, the line of harrow discs of said third outer harrow means 19 has a front end connected to a height adjusting means 31 mounted on said left wing 10 of the frame 2, separated from the tensioning means 32 of the first harrow means 17, and a rear end connected to a tensioning means 56 mounted on the rear part 7 of the frame. The line of harrow discs of the fourth outer harrow means or member 20 has a front end connected to another height adjusting means 31 mounted on said right wing 9 of the frame 2, separated from the tensioning means 32 of the second harrow means 18, and a rear end connected to another tensioning means 56 mounted on the crossbar 54 of the rear part 7 of the frame 2. On the other hand, each inner harrow means is mounted on the corresponding crossbar 55 by means of a combination of a tensioning means 56 and a pivoting support arm 66. However, as mentioned above, this arrangement of outer inner harrow means with their respective mounting means mounted on the frame, are merely exemplary and not limiting for the invention, since their arrangement and combination can vary according to the needs of each user without any inconvenience.

According to FIGS. 11 to 15, in a third preferred embodiment, each harrow means or member may comprise a plurality of discs 202, each of which has an opening 203 and respective fixing holes 204 for the wedge and assembly on at least one hub 205. Wherein, each of the hubs 205 comprises a base plate or central disc-shaped plate 206 that has on one side at least one support and wedge area 207 for a counterweight, said support and wedge area 207 being in turn provided with respective holes 208 which are through and coincide with the fixing holes 204 of the disc 202, while on the other side it has a recess 217.

The connecting members are formed by the base plates 206 that have joint means that comprise a pair of forks 209 arranged on each side of the base plate or central disc-shaped plate 206, being arranged, but not limited to, crosswise one with respect to the other. The joint means also comprise at least one crosshead 210 arranged between each pair of facing forks 209 of adjacent discs 202 so as to jointly generate a mechanical link between the adjacent disc 202-hub 205 assemblies and thus form a line of harrow discs 201 that rotates with respect to respective bearing housings 211 arranged at the ends thereof.

It should be noted that, in order to rotate the line of harrow discs 201, each bearing housing 211 has a rotation axis 212 at whose end the respective fork 209 of the corresponding end disc 202-hub 205 assembly will be attached, while at the other end, the lower end of the corresponding piece will be connected either to the height adjusting means, pivoting support arm or tensioning means described above. Likewise, each fork 209 and crosshead 210 has respective through holes 213 and 214, respectively, which coincide and allow the passage of a bolt or screw 215 for fixing. In turn, each of the hubs 205 can have respective hexagon holes 216 arranged on the hubs to bolt or fix respective counterweights when it is necessary to place them, so that in this way the weight of each hub/disc assembly is increased and thus it is possible to change the work capacity of the chain of discs under more extreme conditions of the soil, in terms of its compaction due to the lack of humidity or the livestock trampling. It is highlighted that said counterweights will be mounted against said support and wedge area 207.

Thus, in this third preferred embodiment, a fork-crosshead assembly is used to make the connection between harrow discs as an alternative to the flexible cable of the first embodiment. However, the advantages obtained by the first embodiment compared to the prior art, apply in the same way or even better for both the second and this third preferred embodiment without any drawback.

According to FIGS. 16 to 22, in a fourth preferred embodiment, the invention consists of a new harrow disc that facilitates both its assembly and its replacement in a practical and rapid manner, avoiding link cuts, welding, movements, delays in operating times and high related costs.

Figure 7:
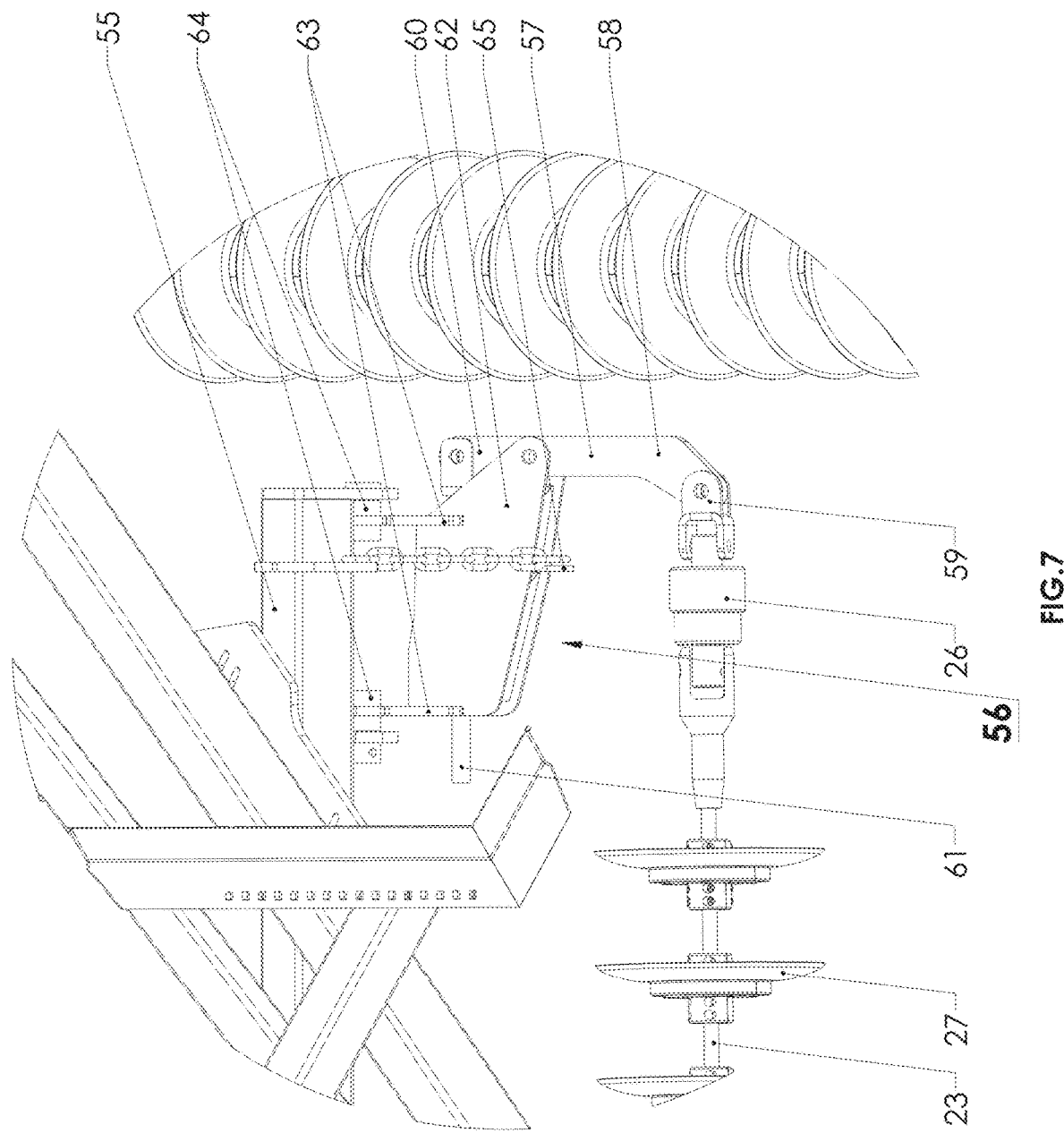
FIG. 7 shows an enlarged view of a mounting end portion of an inner harrow means according to the present invention.
Figure 22:
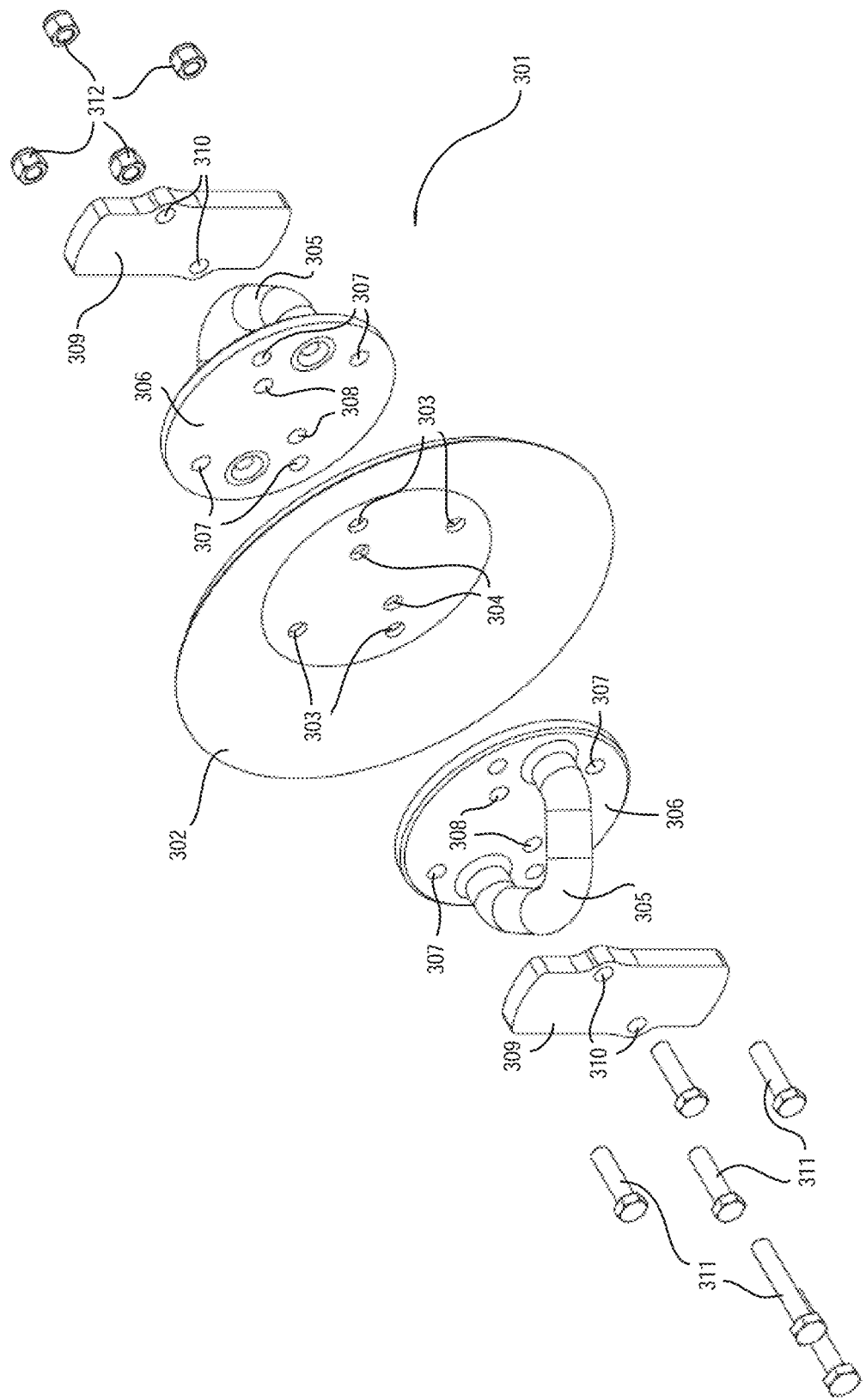
FIG. 22 shows an exploded perspective view of the harrow disc according to the present invention.

According to FIG. 22, the harrow disc of the present invention is indicated by the general reference 301 and comprises a disc plate 302 provided with a plurality of fixing holes comprising outer holes 303 and inner holes 304 (FIG. 7).

Discs 302 are removably connected to each other by means of connecting members comprising a base plate 306, preferably disc-shaped, on each side of disc plate 302, which base plates 306 are fixed to the faces of said disc plate 302 and provided with outer 307 and inner 308 holes coincident in alignment with respective outer 303 and inner 304 holes of the plurality of fixing holes of the disc plate 302. The connection members also comprise a half-link 305 that is fixed, for example by welding to said base plate 306, so that two adjacent half-links, from each adjacent disc 302, are jointed with each other.

On the other hand, the present invention comprises at least one pair of counterweight plates 309 provided on each side of the disc plate 302, each one having holes 310 that are aligned with respective inner holes 308 of the base plate 306 and inner holes 304 of the fixing holes of said disc plate 302. The counterweight plates 309 will add weight to the disc to help and allow a better insertion thereof in the soil to be leveled.

Figure 21:
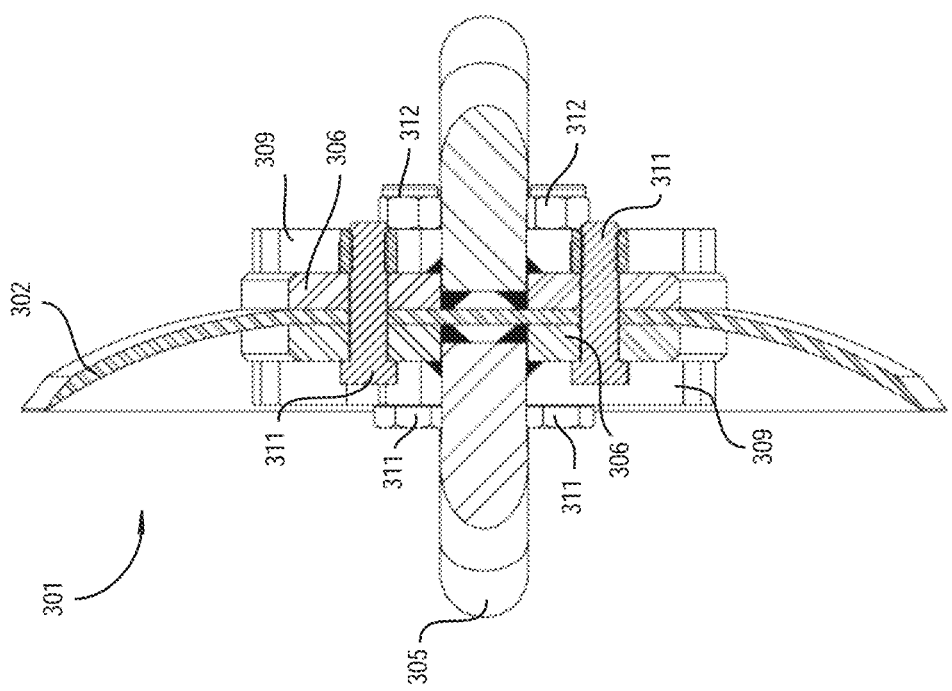
FIG. 21 shows a sectional view of a complementary harrow disc adjacent to that of FIG. 20.
Figure 20:
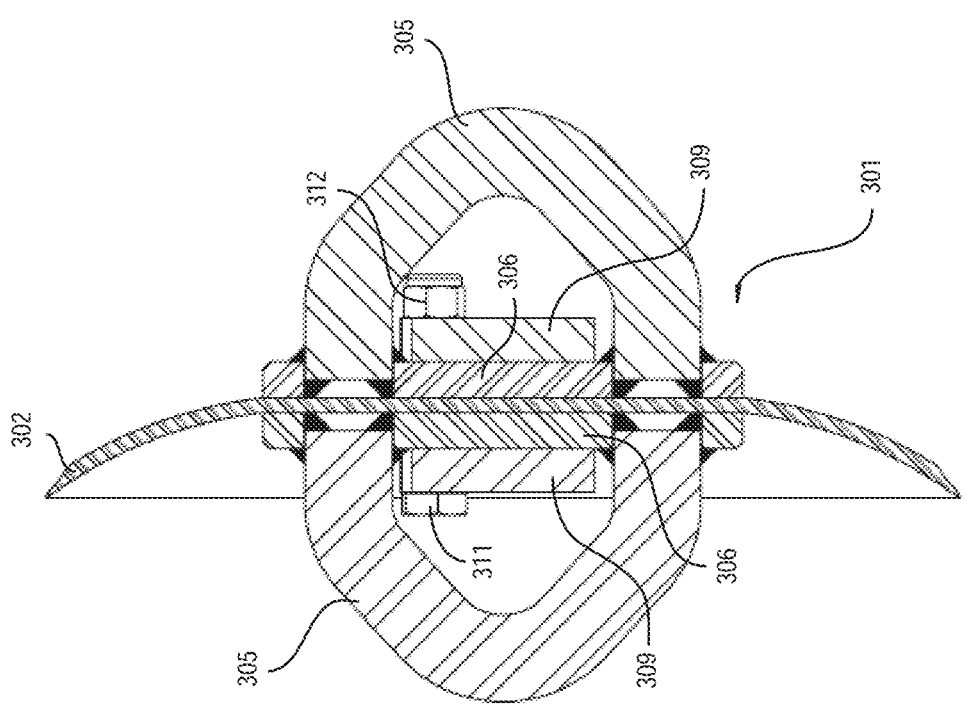
FIG. 20 shows a sectional view of one of the harrow discs according to the invention.

In turn, fixing elements are provided that can be screws, pins or bolts 311 that pass through the holes made on the counterweight plates 309, base plate 306 of the half-links 305 and disc plate 302, operatively fixing them between them, in a removable manner, as best illustrated in FIGS. 20 and 21. The screws, pins or bolts 311 are fixed by locknuts 312.

According to FIGS. 16 to 19, but not limiting the invention, the alternate vertical-horizontal arrangement of the half-links 305 of adjacent discs to form the chain of discs 313 can be observed. That is, in FIGS. 17 to 19, there is a first harrow disc 1a whose half-links 305a are arranged horizontally. Adjacent, there is a second harrow disc 301b, whose half-links 305b are arranged vertically, thus allowing the joint between adjacent discs to form the chain of discs 313. This alternate arrangement of the half-links is projected along the chain 313.

Although it has been illustrated that a harrow disc has both half-links vertically or both horizontally, to later be combined with an adjacent disc that has half-links in a complementary position, this does not imply that the invention is limited to said arrangement, but the same disc can have half-links in combined positions, that is, it can have a half-link in a horizontal position on one side, while on the other side it can have the complementary half-link in the vertical form. Being that the half-links of the adjacent disc must be complemented to form the chain of discs. All the foregoing, being that the half-links are made, but not limited to, in pairs.

Thus, in case of breakage of one of the harrow discs, the user only has to remove the bolts 311 to release the disc from the half-links and counterweight plates, and to replace it with a new one. To fix the new disc, the user proceeds to carry out the inverse steps mentioned above, fixing the base plate 306—counterweights 309 to the disc using the bolts 311—locknut 312. In this way, it avoids having to first cut or break the link and then weld it on site or take the chain to a workshop, as occurs in the prior art, with the time and high costs that this entails. In addition, by means of the invention the replacement times are notably optimized and the continuity in the leveling process can be carried out much more quickly.

In turn, by means of the invention, the use of bolts or pins for fixing the parts is much more practical since any person could easily replace the disc. Quite the contrary occurs in the prior art, wherein it is needed to count with a person being capable of cutting the link, another one capable of welding and that the welding does not have defects that could lead to a detachment of the welding bead and consequently, the detachment of the link disc with the risks that this entails during the leveling operation.

In this way, the harrow device of the present invention is constituted and built, which allows a better leveling and conditioning of the soil, being at the same time that it significantly reduces the loads and stresses generated on its parts, and that in addition, facilitates both the construction and replacement of the parts.

The invention claimed is:

1. A harrow device for the conditioning and leveling of sowing soils, the harrow device comprising:
   a frame which has a front pulling part;
   wheels mounted on said frame; and
   a plurality of harrow means arranged below the frame, wherein
      each harrow means of the plurality of harrow means comprises:
         at least a plurality of discs removably connected to each other by means of connecting members comprising at least one base plate removably fixed to each of said discs and joint means fixed to the base plate, such that the joint means of two adjacent discs are articulately connected to each other; and
         at least one tensioning means mounted on said frame and connected to said harrow means,
      said base plate comprises a central disc-shaped plate that has at least one support and wedge area against the disc, said support and wedge area being in turn provided with respective holes that are through and match with fixing holes of the disc, and
      said joint means comprise a pair of forks arranged on each side of the central disc-shaped plate, and the forks extend transversely to the central disc-shaped plate and axially with respect to each other, and at least one crosshead is arranged between each pair of opposing forks of adjacent discs, jointly defining a mechanical link between the disc-base plate assemblies and forming a line of harrow discs that rotate with respect to the frame.

2. A harrow device according to claim 1, further comprising a height adjusting means comprising:
   at least one support arm having a proximal end mounted on said frame and a distal end connected to at least; and
   an outer telescopic tube within which an inner telescopic tube is mounted having a lower end connected to a bearing housing through a shaft and an upper end that is operatively connected to a threaded turnbuckle.

3. A harrow device for the conditioning and leveling of sowing soils comprising a frame which has a front pulling part, wheels mounted on said frame and a plurality of harrow means arranged below the frame, wherein each of said harrow means comprises: at least a plurality of discs removably connected to each other by means of connecting members comprising at least one base plate removably fixed to each of said discs and joint means fixed to the base plate, such that the joint means of two adjacent discs are articulately connected to each other, and at least one tensioning means mounted on said frame and connected to said harrow means, wherein said tensioning means comprises at least one support arm having a proximal end mounted on said frame and a distal end connected to at least one pivot plate;
  wherein the at least pivot plate comprises:
    a proximal end provided with a fixing plate on which at least one selector cam is pivotally fixed; and
    a distal end connected to a pivot arm having a lower end operatively connected to a bearing housing through a shaft, and an upper end to which a spring is connected,
    wherein said selector cam is connected inferiorly to a tension damper which is mounted between said fixing plate of the pivot plate and said pivot arm, while superiorly, said selector cam is selectively positioned between a plurality of tension selector holes made on a tension selector plate which in turn is connected to said spring.

4. A harrow device according to claim 1, wherein said tensioning means comprises a pivot arm which has a lower end connected to a bearing housing, and an upper end in which an end of a hydraulic cylinder is connected, wherein said hydraulic cylinder is mounted on a clamping plate provided on a pivot plate having a distal end connected to a portion of said pivot arm, and said tensioning means being mounted to a respective portion of said frame by a clamping arm.

5. A harrow device according to claim 1, wherein said harrow means comprise at least four outer harrow means defined as a first harrow means, a second harrow means, a third harrow means and a fourth harrow means, and at least two inner harrow means defined by a front inner harrow means and a rear inner harrow means, each of the harrow means being mounted on the frame by the combination of at least one pivoting support arm, at least one said tensioning means and at least one height adjusting means.

6. A harrow device according to claim 5, wherein:
  said first harrow means is arranged between the front part of the frame and a left wing of the frame;
  said second harrow means is arranged between the front part of the frame and a right wing of the frame;
  said third harrow means is arranged between a rear part of the frame and said left wing;
  said fourth harrowing means is arranged between said rear part of the frame and said right wing;
  said front inner harrow means is arranged below said front part of the frame and between the first-second harrow means; and
  said rear inner harrow means is arranged below said rear part of the frame and between said third-fourth harrow means.

7. A harrow disc for a harrow device that comprises at least a plurality of said discs removably connected to each other by means of connecting members comprising at least one base plate removably fixed to each of said discs and joint means fixed to the base plate, such that the joint means of two adjacent discs are articulately connected to each other, the harrow disc comprising:
  at least one disc plate provided with a plurality of fixing holes;
  said joint means comprising at least one pair of half-links, where at least one of said half-links is arranged on each side of the disc plate, each of said half-links having one of said at least one base plate that is in operative contact with a face of said plate disc and is provided with holes that coincide in alignment with respective holes of the plurality of fixing holes of the disc plate;
  at least one pair of counterweight plates, where at least one of said counterweight plates is provided on each side of the disc plate, each of said counterweight plates having holes that are aligned with respective holes of the fixing holes of said disc plate; and
  fixing elements that pass through the holes made in the counterweight plates, the base plates of the half-links and the disc plate, operatively fixing them to each other in a removable manner.

* * * * *